(12) United States Patent
Adachi

(10) Patent No.: US 10,075,647 B2
(45) Date of Patent: Sep. 11, 2018

(54) CONTROL APPARATUS, CONTROL METHOD, AND STORAGE MEDIUM

(71) Applicant: CANON KABUSHIKI KAISHA, Tokyo (JP)

(72) Inventor: Keiji Adachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/605,723

(22) Filed: Jan. 26, 2015

(65) Prior Publication Data

US 2015/0215546 A1 Jul. 30, 2015

(30) Foreign Application Priority Data

Jan. 27, 2014 (JP) ................. 2014-012800

(51) Int. Cl.
*H04N 5/262* (2006.01)
*H04N 5/232* (2006.01)
*G06K 9/00* (2006.01)
*G06K 9/62* (2006.01)

(52) U.S. Cl.
CPC ..... *H04N 5/23296* (2013.01); *G06K 9/00771* (2013.01); *H04N 5/23219* (2013.01); *G06K 9/6202* (2013.01)

(58) Field of Classification Search
USPC ..................................................... 348/240.2
See application file for complete search history.

(56) References Cited

U.S. PATENT DOCUMENTS

| | | | | |
|---|---|---|---|---|
| 2003/0133025 A1* | 7/2003 | Ojima | ................ | H04N 5/23293 348/240.2 |
| 2005/0046730 A1* | 3/2005 | Li | ....................... | H04N 5/23293 348/333.12 |
| 2006/0216010 A1* | 9/2006 | Yamanouchi | ............ | G03B 5/02 396/55 |
| 2006/0221185 A1* | 10/2006 | Miyamaki | ........ | G08B 13/19602 348/159 |
| 2008/0037840 A1* | 2/2008 | Steinberg | ........... | G06K 9/0234 382/118 |
| 2009/0028386 A1* | 1/2009 | Michimoto | .............. | G06K 9/32 382/103 |
| 2010/0045822 A1* | 2/2010 | Yoon | ...................... | H04N 5/772 348/231.2 |
| 2011/0109786 A1* | 5/2011 | Kimura | .................. | H04N 5/232 348/335 |
| 2012/0062600 A1* | 3/2012 | Fukasawa | .......... | G06K 9/00771 345/660 |
| 2012/0114176 A1* | 5/2012 | Kawano | ............ | G06K 9/00771 382/103 |

(Continued)

FOREIGN PATENT DOCUMENTS

| | | |
|---|---|---|
| CN | 101379825 A | 3/2009 |
| CN | 101512549 A | 8/2009 |
| CN | 102055907 A | 5/2011 |

(Continued)

*Primary Examiner* — Stephen Coleman
(74) *Attorney, Agent, or Firm* — Canon USA Inc., IP Division

(57) ABSTRACT

A control apparatus and method that captures video image includes acquiring a parameter for recognition processing with respect to acquired image data and changing the acquired parameter according to a change in zoom magnification of an image capturing unit.

27 Claims, 9 Drawing Sheets

(56) References Cited

U.S. PATENT DOCUMENTS

2013/0055156 A1\* 2/2013 Miyamoto ......... G06F 17/3089
                                                          715/810

FOREIGN PATENT DOCUMENTS

| CN | 102402694 A | 4/2012 |
|---|---|---|
| CN | 102971820 A | 3/2013 |
| CN | 103098009 A | 5/2013 |
| JP | 2007-072606 A | 3/2007 |
| JP | 2008-016898 A | 1/2008 |
| JP | 2009-092961 A | 4/2009 |
| JP | 2012242970 A | 12/2012 |
| JP | 2013-085201 A | 5/2013 |

\* cited by examiner

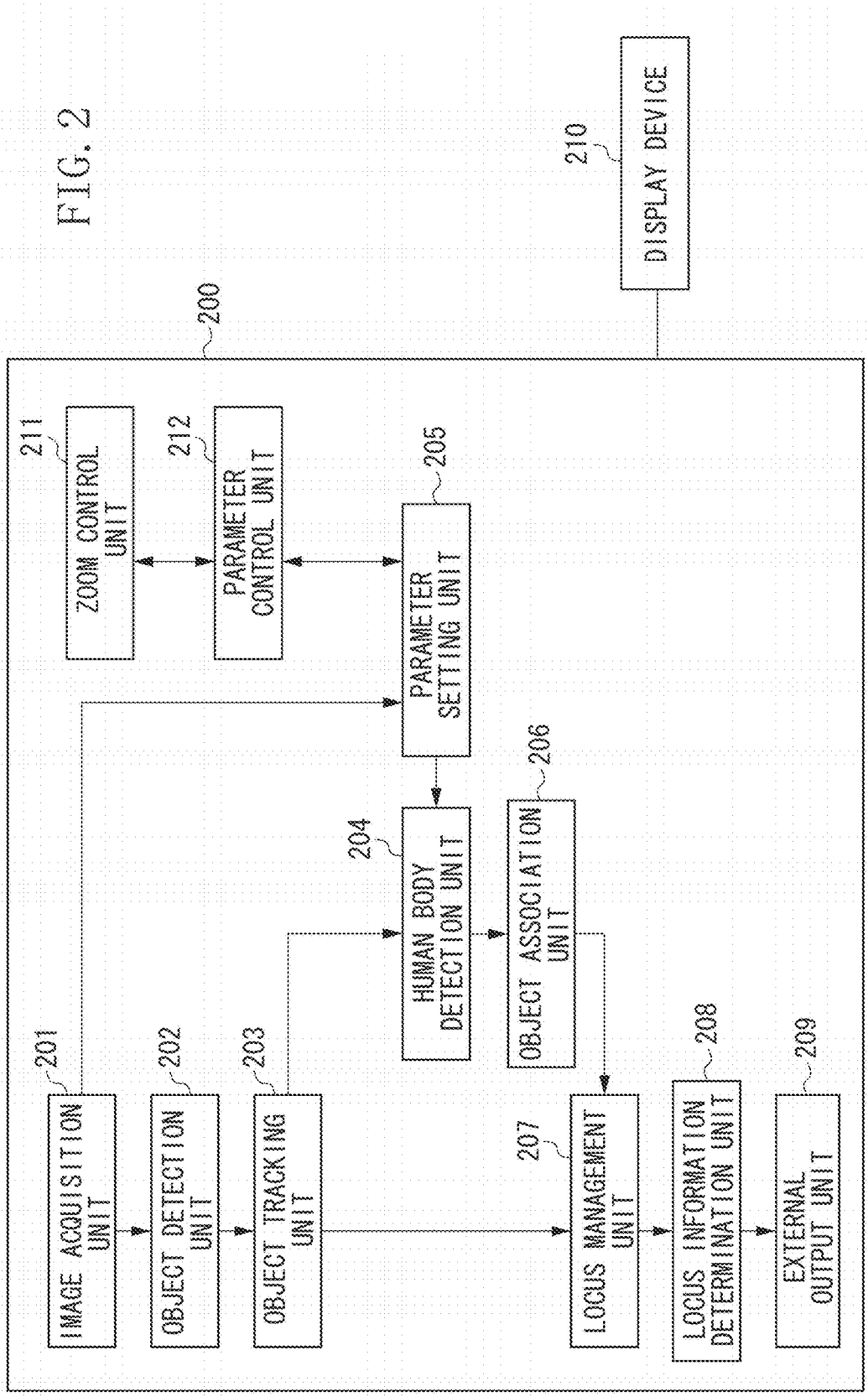

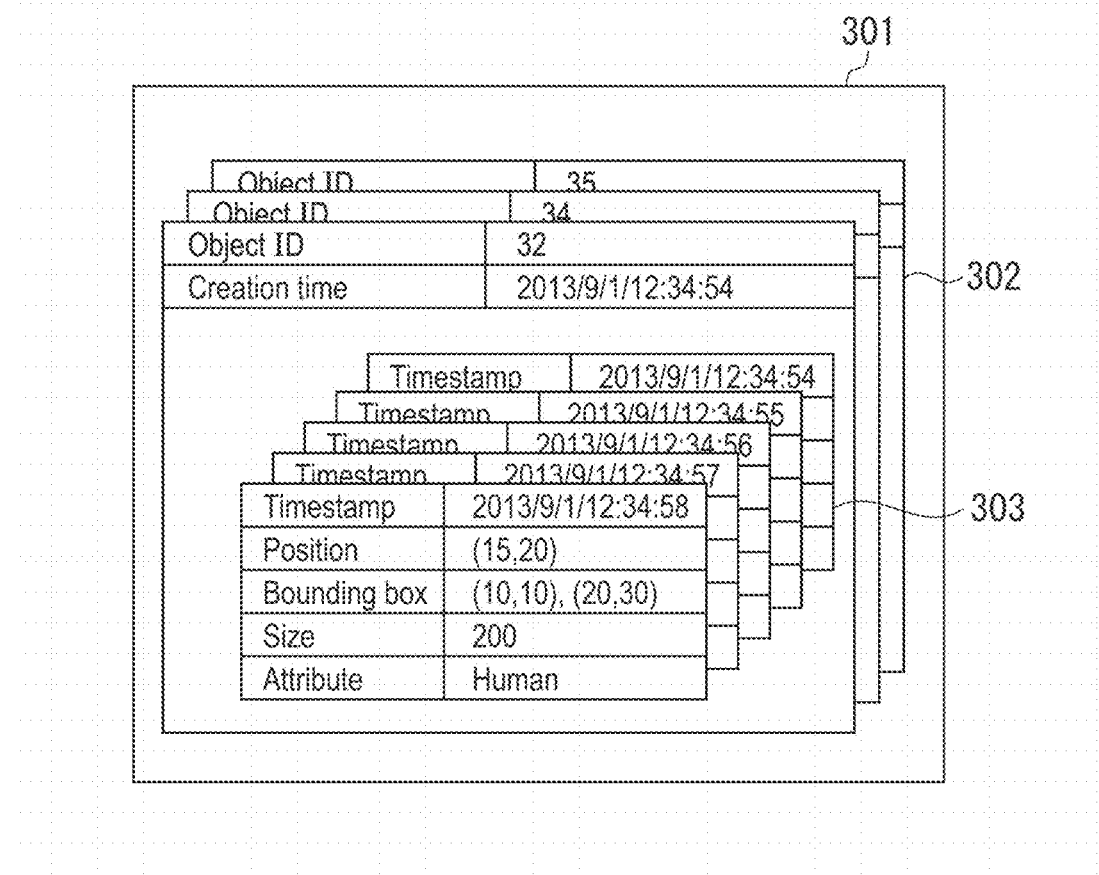

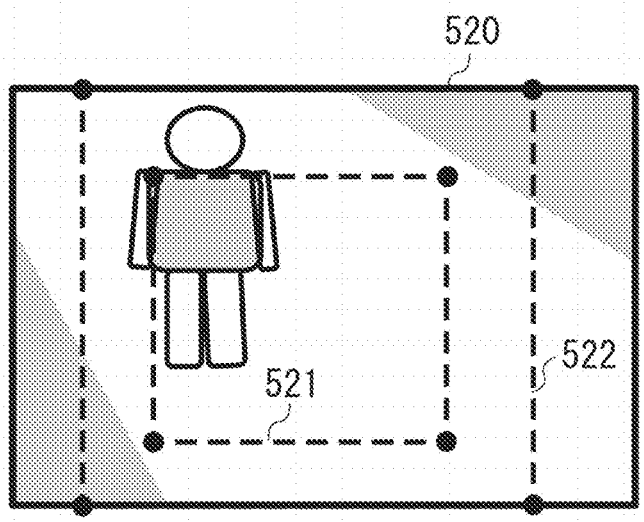

FIG. 6A

| Parameter 1 | |
|---|---|
| Max Size | (900,900) |
| Min Size | (250,250) |
| Zoom Setting | |
| magnification | x1 |

FIG. 6B

| Parameter 1 | |
|---|---|
| Max Size | (1024,1024) |
| Min Size | (625,625) |
| Zoom Setting | |
| magnification | x2.5 |

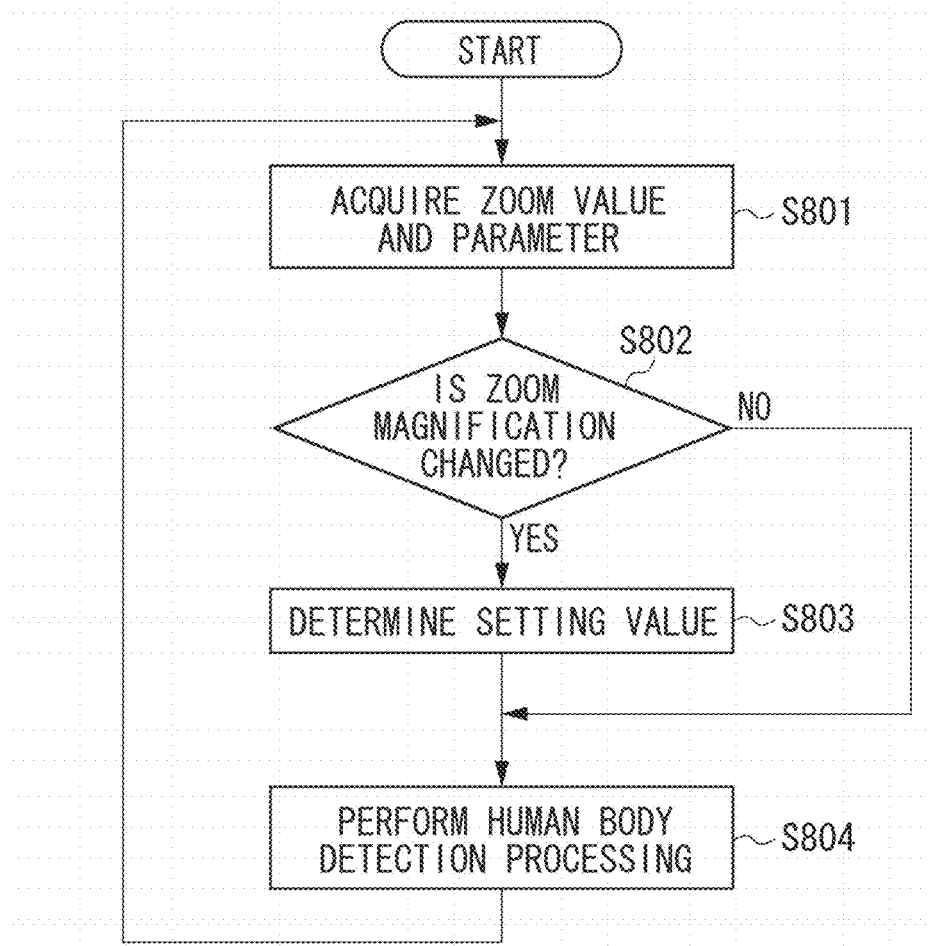

“CONTROL APPARATUS, CONTROL METHOD, AND STORAGE MEDIUM

BACKGROUND

Field

Aspects of the present invention generally relate to a control apparatus, a control method for the control apparatus, and a storage medium.

Description of the Related Art

In monitoring systems and monitoring camera systems, there are techniques for detecting a moving object in a video image by using video image recognition processing. Moreover, there is a recognition technique for constantly capturing a detected moving object. Such a technique is known as a moving object tracking technique.

In addition, Japanese Patent Application Laid-Open No. 2012-242970 discusses video recognition by which an object having a size larger than a predetermined minimum detection size is detected. However, when zoom magnification is changed, there is a possibility that the video image recognition processing may not be performed appropriately.

For example, a zoom magnification may be changed after a maximum size and a minimum size of an object to be detected by recognition processing are set. In such a case, due to a change in the zoom magnification, an object that could be detected if the zoom magnification remains the same may not be detected. Moreover, for example, a zoom magnification may be changed after a maximum size and a minimum size of an object are set. In such a case, due to a change in the zoom magnification, an object that could not be detected if the zoom magnification remains the same may be detected.

SUMMARY

According to an aspect of the present invention, a control apparatus includes an acquisition unit configured to acquire a parameter for recognition processing with respect to image data acquired by image capturing by an image capturing unit, and a control unit configured to change the parameter acquired by the acquisition unit according to a change in zoom magnification of the image capturing unit.

Further features of the present disclosure will become apparent from the following description of exemplary embodiments with reference to the attached drawings.

BRIEF DESCRIPTION OF THE DRAWINGS

FIG. 2 is a block diagram illustrating a configuration example of a control apparatus.

FIG. 3 is a diagram illustrating a structure example of information managed by a locus management unit.

FIGS. 5A, 5B, and 5C are diagrams illustrating examples of screens used when a human body detection size is set.

FIGS. 6A and 6B are diagrams illustrating structure examples of parameters for video image recognition processing.

FIG. 8 is a flowchart illustrating processing performed by a parameter control unit.

DESCRIPTION OF THE EMBODIMENTS

Various exemplary embodiments will be described in detail below with reference to the drawings. Configurations described in exemplary embodiments below are merely examples and are not seen to be limited to the following configurations.

Figure 1:
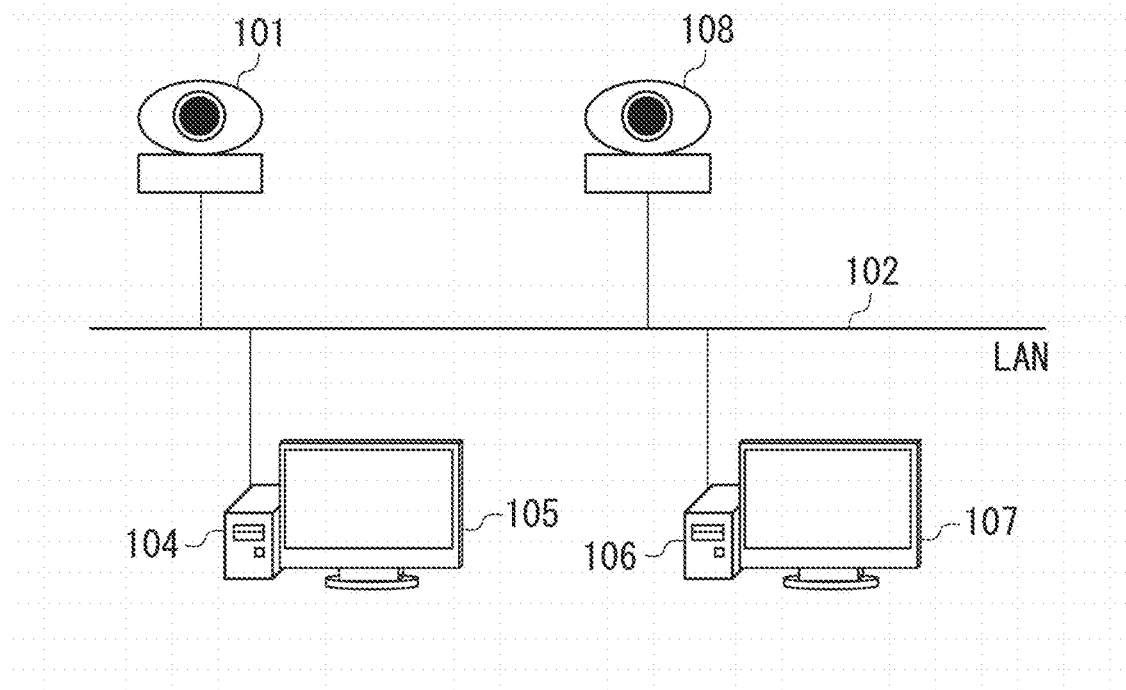
FIG. 1 is a diagram illustrating a configuration of a video image processing system.

FIG. 1 is a diagram illustrating a configuration of a video image processing system. The video image processing system includes cameras 101 and 108, a network 102 such as a local area network (LAN), personal computers (PCs) 104 and 106, and displays 105 and 107. Each of the cameras 101 and 108 includes an optical zoom mechanism. The displays 105 and 107 display images based on image data from the cameras 101 and 108, and processing results of the PCs 104 and 106. Moreover, each of the displays 105 and 107 can provide a user interface used when a setting of video image recognition processing according to the present disclosure is made.

A configuration example of a control apparatus 200 of a first exemplary embodiment is described with reference to FIG. 2. In the description of the present exemplary embodiment, the control apparatus 200 is installed in a camera (e.g., the camera 101 or the camera 108 illustrated in FIG. 1). However, a function of the control apparatus 200 may be performed by, for example, a PC (corresponding to the PC 104 or the PC 106 illustrated in FIG. 1), or an image processing circuit mounted inside a camera capable of capturing moving images. Alternatively, a function of the control apparatus 200 may be performed by other devices. The control apparatus 200 has a function of not only displaying a setting screen for setting a parameter of video image recognition processing (e.g., human body detection) on a display screen of a display device 210, but also setting a parameter corresponding to an instruction from a user with respect to the parameter setting screen. In the present exemplary embodiment, the display device 210 illustrated in FIG. 2 corresponds to the displays 105 or 107.

The control apparatus 200 includes an image acquisition unit 201, an object detection unit 202, an object tracking unit 203, a human body detection unit 204, a parameter setting unit 205, an object association unit 206, a locus management unit 207, a locus information determination unit 208, and an external output unit 209. Moreover, the control apparatus 200 includes a zoom control unit 211 that controls the zoom mechanism of the camera, and a parameter control unit 212 that controls a parameter according to a zoom magnification (a zoom value). The control apparatus 200 is connected to the display device 210 including, for example, a cathode ray tube (CRT) and a liquid crystal display. The display device 210 displays a processing result of the control apparatus 200 by using images and characters. Hereinafter, a description is mainly given of a case where a moving image is displayed on a display screen of the display device 210.

The image acquisition unit 201 acquires a moving image or a still image supplied from an internal imaging sensor or an external unit, and transmits the acquired moving image or still image to the object detection unit 202.

Upon acquisition of the moving image, the image acquisition unit 201 sequentially transmits each of frame images forming the moving image to the object detection unit 202. On the other hand, upon acquisition of the still image, the image acquisition unit 201 transmits the acquired still image to the object detection unit 202. The supply source of the moving image or the still image is not limited to the internal imaging sensor or the external unit. For example, the moving image or the still image may be supplied from a server apparatus or an image capturing apparatus in a wired or wireless manner. Alternatively, the moving image or the still image may be acquired from a memory inside the control apparatus 200 instead of the external unit. In the description below, the object detection unit 202 receives one image regardless of whether the image acquisition unit 201 has acquired a moving image or a still image. If the image acquisition unit 201 acquires the moving image, the object detection unit 202 receives one image that corresponds to each frame of the moving image. On the other hand, if the image acquisition unit 201 acquires the still image, the object detection unit 202 receives one image that corresponds to the still image.

The object detection unit 202 uses a background subtraction technique to detect an object from the frame image acquired from the image acquisition unit 201. That is, the object detection unit 202 compares the frame image acquired by the image acquisition unit 201 and a predetermined frame image (a background image) to detect the object. Subsequently, the object detection unit 202 generates object information according to the detected object. The object information includes information about a position of the object on the screen, a circumscribed rectangle, and an object size. Although the object detection unit 202 has the function of detecting the object from the image by using the background subtraction technique, the detection technique is not limited thereto.

The object tracking unit 203 associates objects detected from a plurality of respective frame images with each other, based on the object information corresponding to the plurality of frame images. For example, the object detection unit 202 may detect, from an image in a target frame, an object corresponding to an object detected from an image in the immediate preceding frame of the target frame. In such a case, the object tracking unit 203 associates these objects in the respective frames with each other.

For example, the object tracking unit 203 assigns "object identification (ID)=A" to the object detected by the object detection unit 202 from the image in the immediate preceding frame of the target frame. If the object detection unit 202 detects an object corresponding to the object having "object ID=A" from the image in the target frame, the object tracking unit 203 assigns "object ID=A" to this object as well. Accordingly, if the object corresponding to each of the plurality of frames is detected, the object tracking unit 203 assigns the same object ID to each of such objects. The object tracking unit 203 assigns a new object ID to an object newly detected in the target frame.

The object tracking unit 203 can use a following method for determining whether objects in different frames correspond to each other. According to the determination method, if a predicted movement position of an object identified by using a movement vector of a detected object and a position of the detected object are provided within a certain distance, the object tracking unit 203 determines that these objects are substantially the same. That is, the object tracking unit 203 identifies a distance between a position of an object detected from a frame image and a position of an object identified based on movement vector information about the frame image. If the identified distance is less than a threshold value, the object tracking unit 203 associates this object with the object in the other frame image.

However, the object association method is not limited thereto. For example, the object tracking unit 203 may use color, shape, and size (area) of an object to associate one object with another. In such a case, objects having a high correlation between frames are associated. Moreover, a combination of movement vector information and information such as color, shape, and size of an object may be used for object association. The object tracking unit 203 associates the objects detected in the plurality of frames with each other according to a predetermined condition, and tracks the associated objects. For example, in a case where the same person is detected in a plurality of frames, the object tracking unit 203 assigns the same object ID to the person. The object association method is not limited to a specific method. Various methods that perform processing similar to the above may be used.

The human body detection unit 204 executes human body detection processing with respect to a region in which the object detection unit 202 has detected an object, from among object detection regions set by the parameter setting unit 205, thereby detecting a human body. The human body detection unit 204 of the present exemplary embodiment executes the human body detection processing with respect to a region (a human body detection region) including a region in which the object is detected and the vicinity thereof. For example, the human body detection unit 204 may detect an object having a width and height of 20 pixels by 100 pixels around coordinates (X, Y) within a frame. In such a case, the human body detection unit 204 performs the human body detection processing with respect to a region having a width and height of 30 pixels and 150 pixels around the coordinates (X, Y) of the frame.

Moreover, the human body detection unit 204 refers to maximum and minimum sizes for human body detection set by the parameter setting unit 205. Accordingly, the human body detection unit 204 can omit the human body detection processing outside the range of the maximum size and the minimum size. That is, in the human body detection region identified by detection of the object, the human body detection unit 204 can omit the human body detection processing if the human body detection region is larger than the maximum size. The human body detection unit 204 can also omit the human body detection processing if the human body detection region is smaller than the minimum size. However, the human body detection unit 204 may perform the human body detection processing without carrying out such omission, and then a detection result of a human body that is larger than the maximum size and a detection result of a human body that is smaller than the minimum size can be excluded from processing results of the human body detection processing.

The human body detection unit 204 compares a pattern image of a human body and a frame image to detect the human body from the frame image. However, the human body detection method is not limited thereto. Besides, in the present exemplary embodiment, a detection target is a human body. However, the detection target is not limited thereto. Alternatively, a detection target may be a face of a person, a bicycle, and an animal. Moreover, the human body detection unit 204 can simultaneously execute a plurality of types of detection processing such that a plurality of types of specific objects is detected. That is, the human body detection unit 204 of the present exemplary embodiment can detect not only a human body, but also various predetermined objects from image data by using recognition processing.

Moreover, the human body detection region may not necessarily be determined based on the region in which the object detection unit 202 has detected the object. For example, the human body detection unit 204 may identify a human body detection region from a parameter set by the parameter setting unit 205, thereby performing human body detection processing. In such a case, the object detection unit 202 may omit object detection processing.

The parameter setting unit 205 sets, for example, a parameter regarding a detection processing range (a human body detection region) of the human body detection processing in each frame, and a parameter regarding maximum and minimum sizes for human body detection.

In addition to the setting of the human body detection, the parameter setting unit 205 may similarly set a parameter regarding detection processing to be performed by the object detection unit 202. For example, the parameter setting unit 205 can set parameters regarding an object detection region and maximum and minimum sizes for object detection as parameters for the object detection unit 202. However, in the present exemplary embodiment, the object detection region is an entire image acquired by the image acquisition unit 201. Generally, the smaller the object detection region, the higher the processing speed.

Figure 4A:
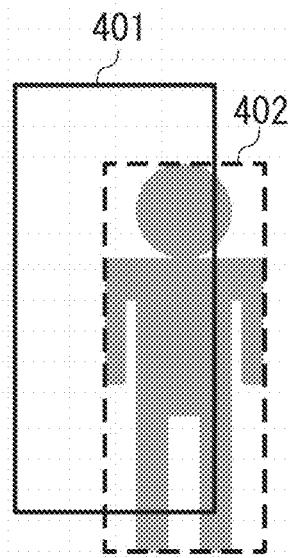
FIGS. 4A and 4B are diagrams illustrating examples of association between an object and a human body.

The object association unit 206 associates the object detected by the object detection unit 202 with the human body detected by the human body detection unit 204. An example of such association of the object with the human body is described with reference to FIGS. 4A and 4B. FIG. 4A illustrates an example case in which a circumscribed rectangle 401 of the object detected by the object detection unit 202 does not include a circumscribed rectangle 402 of the human body detected by the human body detection unit 204. The object detection unit 202 of the present exemplary embodiment performs the object detection processing with respect to the entire frame. The human body detection unit 204 performs the human body detection processing with respect to a region serving as the human body detection region, including a vicinity of the circumscribed rectangle of the object detected by the object detection unit 202.

When the object and the human body are detected as illustrated in FIG. 4A, the object association unit 206 associates the object with the human body if an overlap ratio exceeds a threshold value that is set beforehand. The overlap ratio is a ratio of the circumscribed rectangle 402 of the human body to the circumscribed rectangle 401 of the object. That is, if the ratio of an overlap area in which the circumscribed rectangle 401 of the object overlaps with the circumscribed rectangle 402 of the human body, to an area of the circumscribed rectangle 402 of the human body exceeds the threshold value, the object association unit 206 associates the object corresponding to the circumscribed rectangle 401 with the human body corresponding to the circumscribed rectangle 402.

Figure 4B:
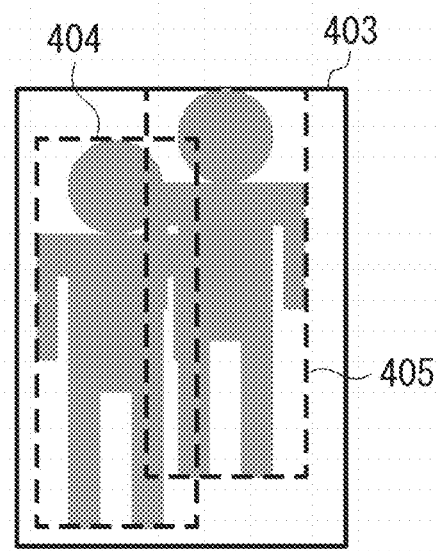

On the other hand, FIG. 4B illustrates an example case in which a plurality of human bodies is detected from a circumscribed rectangle 403 of a detected object. In such a case, if a ratio of an overlap area in which the object circumscribed rectangle 403 overlaps with a circumscribed rectangle 404 of a human body, to an area of the circumscribed rectangle 404 exceeds a threshold value, the object association unit 206 associates the object corresponding to the circumscribed rectangle 403 with the human body corresponding to the circumscribed rectangle 404. Moreover, if a ratio of an overlap area in which the object circumscribed rectangle 403 overlaps with a circumscribed rectangle 405 of a human body, to an area of the circumscribed rectangle 405 exceeds a threshold value, the object association unit 206 associates the object corresponding to the circumscribed rectangle 403 with the human body corresponding to the circumscribed rectangle 405. There are cases where the object association unit 206 associates one object with a plurality of human bodies. The association of the object with the human body is not limited to the above-described method.

The locus management unit 207 acquires information about objects from the object detection unit 202, the object tracking unit 203, and the object association unit 206 to manage the acquired information as management information for each object. An example of management information 301 managed by the locus management unit 207 is described with reference to FIG. 3. The locus management unit 207 of the present exemplary embodiment manages object information 302 for each object ID as illustrated in FIG. 3. The object information 302 corresponding to one object ID includes a time stamp indicating a date and time when the object information is generated. The object information 302 also includes information 303 of each frame in which the object is detected. The information 303 includes a time stamp when the information is generated, a coordinate position (Position) of the detected object, information (Bounding box) indicating a circumscribed rectangle including a region of the detected object, a size of the object, and an attribute of the object. However, information to be included in the information 303 is not limited to those pieces of information. The information 303 may include other information. The locus information determination unit 208 uses such management information 301 managed by the locus management unit 207.

The locus management unit 207 updates the attribute (Attribute) of the object according to a result of the association by the object association unit 206. Moreover, the locus management unit 207 may update an attribute (Attribute) of a past object according to the association result. The locus management unit 207 may update an attribute (Attribute) of a subsequent object according to the association result. With such processing, tracking results of the objects having the same object ID can have the same attribute at any time.

The locus information determination unit 208 functions as a passing object detection unit. The locus information determination unit 208 performs processing for determining whether the object has passed through a detection line according to the parameter set by the parameter setting unit 205 and the management information managed by the locus management unit 207. The detection line can be set by a user. For example, the user can operate a user interface on a parameter setting screen of the display device 210 to set the detection line. The parameter setting unit 205 of the present exemplary embodiment, for example, can set information for identifying a line segment set by the user as a parameter in the locus information determination unit 208.

The locus information determination unit 208 determines whether a movement vector intersects the line segment for passage detection, the movement vector indicating a movement from a circumscribed rectangle of a human body attribute object in the immediate preceding frame of a target frame to a circumscribed rectangle of a human body attribute object in the target frame. In the present exemplary embodiment, a human body attribute object represents an object associated with the human body by the object association unit 206. Moreover, such intersection determination corresponds to determination whether the human body attribute object has passed the line segment for passage detection. A result of determination made by the locus information determination unit 208 may be output to an external unit (e.g., the display device 210) via the external output unit 209. Moreover, the external output unit 209 may have a function of a display unit including CRT or a liquid crystal screen. In such a case, the determination result can be displayed by using the external output unit 209 instead of the display device 210.

The present exemplary embodiment has been described using the example case in which the locus information determination unit 208 detects that the human body attribute object has passed a predetermined line segment. However, the present exemplary embodiment is not limited to such an example case. For example, in a case where a predetermined region is set as a parameter, the locus information determination unit 208 may detect that the human body attribute object has intruded into the region. Moreover, the locus information determination unit 208 may detect that an animal object has intruded into the region instead of the human body attribute object. In addition, the locus information determination unit 208 may execute various detection processing using locus information and a parameter of event detection.

Next, video image recognition processing according to the first exemplary embodiment is described with reference to FIGS. 5A, 5B, 5C, 6A and 6B.

Figure 5A:
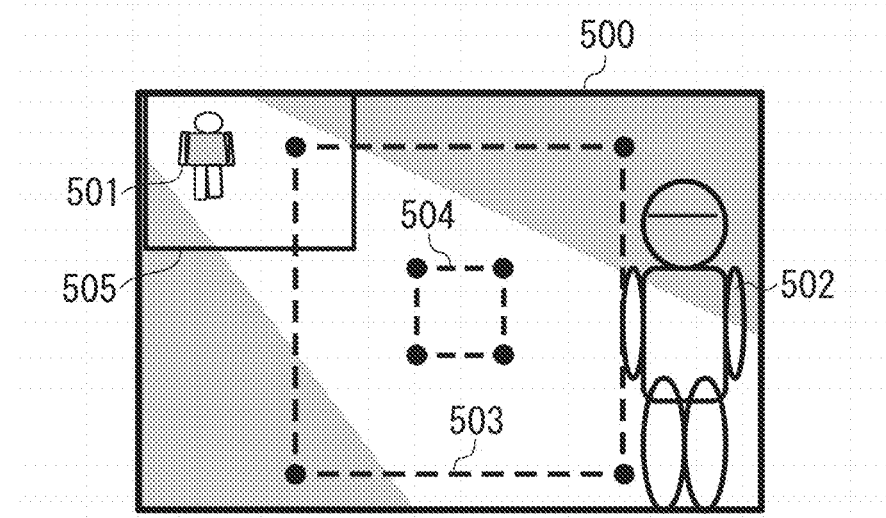
Figure 5B:
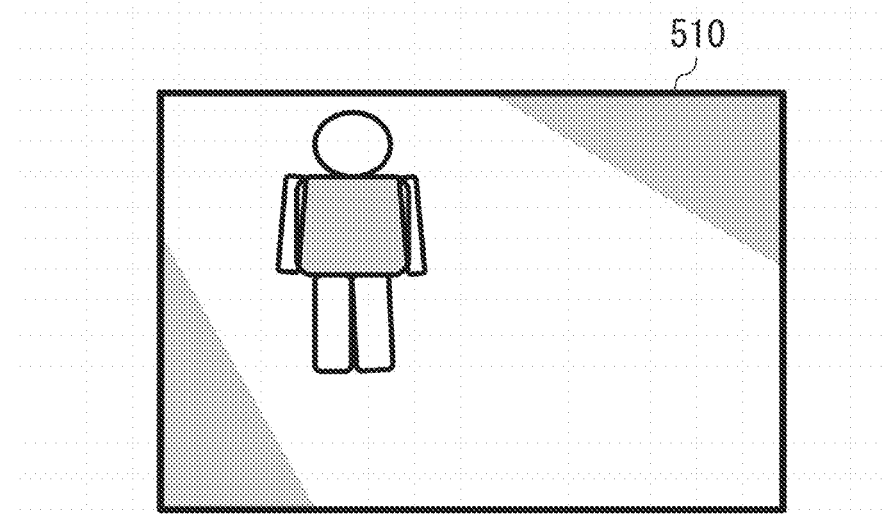

FIGS. 5A through 5C are diagrams illustrating a setting of human body detection size. A parameter setting screen illustrated in each of FIGS. 5A through 5C is displayed on the display device 210, for example.

FIG. 5A illustrates an example of a screen on which a maximum size and a minimum size for human body detection are set.

In FIG. 5A, a setting screen 500 serves as a screen on which a parameter of human body detection is set. On the screen 500 illustrated FIG. 5A, a street, a human body 501, and a human body 502 are shown. The street extends from the upper left to the lower right of the screen 500. The human body 501 is shown in the upper left (far), whereas the human body 502 is shown in the lower right (near). A setting rectangle 503 serves as a user interface (UI) used to set a maximum size for human body detection. Similarly, a setting rectangle 504 serves as a UI used to set a minimum size for human body detection.

The human body detection unit 204 of the present exemplary embodiment compares a pattern image of a human body with a frame image to detect a human body from the frame image. In particular, the human body detection unit 204 rescales the frame image according to sizes of the setting rectangles 503 and 504. Then, the human body detection unit 204 compares the rescaled frame image with the pattern image of the human body to detect a human figure. For example, the human body detection unit 204 generates frame images that are respectively rescaled to one-half, one-third, and one-fourth according to the sizes of the setting rectangles 503 and 504. Subsequently, the human body detection unit 204 compares each of the generated images with the pattern image of the human body, thereby detecting a human body.

In such a case, when the user performs an operation to reduce a zoom magnification, the human body detection unit 204 controls the magnification of the frame image such that the human figure detected before reduction in the zoom magnification is detected even after the zoom magnification is changed. Particularly, the human body detection unit 204 generates, for example, frame images that are respectively rescaled to one-third, one-fourth, and one-sixth. Subsequently, the human body detection unit 204 compares each of the generated images with the pattern image of the human body, thereby detecting the human body.

The detection method for human body is not limited to the above-described method. For example, the human body detection unit 204 may rescale a pattern image of a human body according to sizes of the setting rectangles 503 and 504, so that the rescaled pattern image of the human body and a frame image may be compared to detect a human body.

Accordingly, the human body detection processing is performed such that only a human body within a set range of the human body detection size is detected. This can enhance speed or accuracy of the processing. The sizes of the setting rectangles 503 and 504 can be changed by a mouse operation performed by an operator. The mouse operation includes dragging a border or a node of the setting rectangles 503 and 504. The diagram illustrated in FIG. 5A has been described using the example case in which the maximum size and the minimum size for human body detection are set. However, only a maximum size or a minimum size may be set.

FIG. 5B is a display example of a screen on which one region of the screen illustrated in FIG. 5A is zoomed in. A rectangular zoom range 505 illustrated in FIG. 5A corresponds to the screen illustrated in FIG. 5B. Thus, when the zoom range 505 illustrated in FIG. 5A is zoomed in, a screen 510 illustrated in FIG. 5B is obtained. In FIG. 5B, the zoom range 505 illustrated in FIG. 5A is magnified 2.5 times.

FIGS. 6A and 6B are diagrams illustrating structure examples of setting parameters set by the parameter setting unit 205. The control apparatus 200 can display parameter display screens illustrated in FIGS. 6A and 6B on the display device 210, for example.

FIG. 6A is a diagram illustrating setting values of the setting rectangles 503 and 504.

In FIG. 6A, a maximum size (Max Size) for human body detection is set to a width and height of (900, 900) pixels, whereas a minimum size (Min Size) is set to a width and height of (250, 250) pixels. The screen 500 has a resolution of (1280, 1024) in width and height. Herein, zoom magnification is same size magnification.

Herein, assume that the setting values illustrated in FIG. 6A are applied as they are, to a zoomed screen as illustrated in FIG. 5B.

As shown on the screen 510 in FIG. 5B, the use of a zoom-in operation enlarges an image of the human body to be captured. After the zoom-in operation, it is conceivable that the image of the human body in a size that is larger than that of the setting rectangle 503 (Max size in FIG. 6A) may be captured. However, in a case where the maximum size (900, 900) for human body detection is applied as is, there is a possibility that a large human body may not be detected.

Moreover, for example, an object that has a size smaller than the minimum size for human body detection before being zoomed in should not undergo the human body detection processing. However, such an object may become a target object for the human body detection processing after being zoomed in. In such a case, the human body detection processing that is not intended by the user may be performed, causing an increase in a processing load.

Such a problem may also occur when the object is zoomed out. That is, when the use of the zoom-out operation reduces a size of the human body within a frame, the parameter of the minimum size for human body detection may not be changed before and after the zoom-out operation. In such a case, there is a possibility that a human body may not be detected. In addition, the maximum size for human body detection may not be changed before and after the zoom-out operation. In such a case, the human body detection processing needs to be performed with respect to a human body that did not have a detection target size before being zoomed out, causing consumption of unnecessary processing time.

The parameter control unit 212 of the present exemplary embodiment changes a parameter to be used in video image recognition processing according to a change in zoom magnification. The parameter is, for example, a maximum size and a minimum size for human body detection. With the change in the parameter, the parameter control unit 212 enables suitable recognition processing to be performed even after the zoom magnification is changed. As described above, the human body detection unit 204 of the present exemplary embodiment compares a pattern image of the human body with a plurality of rescaled frame images, thereby detecting the human body. In this example, a scale factor used to rescale the frame image is changed according to a change in the zoom magnification. That is, the parameter control unit 212 changes the maximum size and the minimum size of the frame image to be used for human body detection according to a change in the zoom magnification.

Moreover, the human body detection unit 204 rescales the pattern image of the human body, and compares the rescaled pattern image and the frame image to detect the human body. When the human body detection unit 204 performs such human body detection, a scale factor used to rescale the pattern image of the human body is changed according to a change in the zoom magnification. That is, the parameter control unit 212 changes the maximum size and the minimum size of the pattern image to be used for human body detection according to a change in the zoom magnification.

FIG. 5C is an example of a screen displayed when the screen 500 illustrated in FIG. 5A is zoomed in and the setting value illustrated in FIG. 6A is changed according to the zoom magnification. The parameters illustrated in FIG. 6A are changed to parameters illustrated in FIG. 6B by the processing which will be described below. The human body detection unit 204 executes the human body detection processing based on the changed parameters.

When the screen 500 illustrated in FIG. 5A is zoomed to a screen 520 illustrated in FIG. 5C, a zoom magnification changes from same size to 2.5 times. The parameter control unit 212 of the present exemplary embodiment changes the maximum size and the minimum size for human body detection according to such a change in the zoom magnification. The parameter control unit 212 changes the minimum size for human body detection to a size (625, 625) illustrated in FIG. 6B, which is 2.5 times as large as that (250, 250) illustrated in FIG. 6A. Thus, the minimum size illustrated in FIG. 6B is applied after the zoom magnification is changed. Similarly, the maximum size for human body detection should be changed to a size that is 2.5 times as large as that illustrated in FIG. 6A. However, since such a size exceeds a screen range, the parameter control unit 212 of the present exemplary embodiment changes the maximum size to a size (1024, 1024) in which a height of the screen 520 is an upper limit.

The parameter control unit 212 of the present exemplary embodiment executes such parameter change processing each time zoom magnification information is received from the zoom control unit 211. Moreover, each time the parameter is changed, the parameter control unit 212 notifies a parameter setting tool side of the changed parameter. This enables a UI to be dynamically changed according to a change in the zoom magnification.

FIG. 5C is a diagram illustrating a UI of the parameter setting tool, the UI being displayed after the maximum size and the minimum size for human body detection processing are changed according to a change in the zoom magnification. A rectangle 522 illustrated in FIG. 5C corresponds to the setting rectangle 503 illustrated in FIG. 5A, whereas a rectangle 521 illustrated in FIG. 5C corresponds to the setting rectangle 504 illustrated in FIG. 5A.

As described above, when a zoom control that steps up a zoom magnification is performed after the maximum size or the minimum size for human body detection is designated, the parameter control unit 212 of the present exemplary embodiment controls the maximum size and the minimum size to be larger than those prior to the zoom control. Moreover, when a zoom control that reduces a zoom magnification is performed after the maximum size or the minimum size for human body detection is designated, the parameter control unit 212 controls the maximum size and the minimum size to be smaller than those prior to the zoom control.

Alternatively, when changing the parameter according to a change in the zoom magnification, the parameter control unit 212 may display a message about the change in the parameter on a screen. Alternatively, before changing the parameter, the parameter control unit 212 may display a parameter change notification on the screen, so that the parameter control unit 212 may change the parameter after receiving approval from the user.

Moreover, in the present exemplary embodiment, the parameters relating to the maximum size and the minimum size for human body detection are changed according to the zoom magnification. However, in a case where the changed size exceeds a predetermined threshold value, the human body detection processing may be stopped or canceled. Alternatively, a message such as a warning message may be displayed instead of stopping or cancelling the human body detection processing. Therefore, for example, an error in the parameter of the recognition processing can be prevented.

The present exemplary embodiment has been described using the example case in which a human body detection size is set by using a rectangle. However, other shapes such as a polygon and a circle may be used.

Moreover, in the present exemplary embodiment, the parameters changed by the parameter control unit 212 serve as the maximum size and the minimum size for human body detection. However, other parameters that are dependent on a captured image size or a location on an image may be used. In the above description, for example, if a distance between a position of an object detected from a frame image and a position of an object identified by a movement vector relating to the frame image is less than a threshold value, the object tracking unit 203 associates the object with an object of another frame. However, this threshold value may be a parameter that changes according to a change in zoom magnification.

Moreover, for example, a parameter (a region or a line segment for passage detection) used for event detection by the locus information determination unit 208 may be changed according to a change in zoom magnification. More particularly, the parameter control unit 212 can change a position or a length of a line segment used for the passage detection and a position or a size of a region used for intrusion detection, according to a change in zoom magnification.

Moreover, for example, an object detection range may be used as a parameter that changes according to a change in zoom magnification. In the present exemplary embodiment, the object detection range has been described as an entire screen.

Moreover, in the above description, for example, if an overlap ratio exceeds a threshold value, the object association unit 206 associates an object with a human body. The overlap ratio represents a ratio of an overlap area in which a circumscribed rectangle of the object overlaps with a circumscribed rectangle of the human body, to an area of the circumscribed rectangle of the human body. The threshold value in such a case may be set as a parameter that changes according to a change in zoom magnification. Since a ratio such as the overlap ratio compares the areas, the ratio is not converted by the same magnification based on the zoom magnification as the human body detection size according to the present exemplary embodiment. The parameter control unit 212 of the present exemplary embodiment uses a table in which the zoom magnification and the overlap ratio are associated, thereby changing a parameter that is not converted by the same magnification.

The present exemplary embodiment has been described using the example case in which a parameter is relatively converted according to a change in zoom magnification by using a maximum size or a minimum size for human body detection designated via a user interface, as a reference value. That is, in the above description, for example, if the zoom magnification is doubled after the maximum size (the reference size) for human body detection is set by using the user interface, the maximum size for human body detection is increased to a value twice as large as the reference value. However, the present exemplary embodiment is not limited thereto.

For example, assume that an absolute range three-dimensional region and an absolute size range can be acquired. In the absolute range three-dimensional region, a camera position and a position in which a detection target object (herein, a human body) can be present are identified. The absolute size range is a range that the detection target object can take within the absolute range three-dimensional region. The acquisition of the absolute range three-dimensional region and the absolute size range enables the parameter control unit 212 to identify an appropriate parameter (herein, a maximum size and a minimum size for human body detection) with respect to a zoom value. Moreover, by using the zoom value when the parameter is determined, as a reference value, the parameter control unit 212 can change a recognition parameter according to subsequent changes in zoom magnification.

Moreover, in FIGS. 5A, 5B, and 5C, an angle of the camera is set such that a lower limit of the object size is finite. That is, the present exemplary embodiment has been described using the example case in which a camera position, a depression angle, and a detection target object are provided such that the upper limit and the lower limit of size of a human body to be captured on a video image are finite. However, for example, in a case where an object is positioned at infinity, it is theoretically conceivable that the maximum size and the minimum size may not be set depending on a camera position, a direction in which the camera is facing, and a type of the object to be detected. In such a case, an object detection parameter according to a change in a zoom value (a zoom magnification) should not be changed, or a minimum size may be intentionally set. Alternatively, a camera installation location or a camera installation direction may be changed. The control apparatus 200 of the present exemplary embodiment can select, based on an operation by the user, whether to change the parameter according to a change in the zoom magnification.

In the present exemplary embodiment, the optical zoom is used as the zoom mechanism of the camera. However, a digital zoom may be used. Hereinafter, a description is given for processing performed when the digital zoom is employed as the zoom mechanism of the camera.

When the digital zooming is carried out, a zoom range 505 on the screen 500 is displayed as shown in the screen 510. In such a case, the parameter control unit 212 changes the setting rectangles 503 and 504 according to a digital zoom magnification similar to the optical zoom. For example, if the zoom magnification is changed from same size to 2 times by the digital zoom, the parameter control unit 212 changes and enlarges a maximum size and a minimum size for object detection by 2 times. Subsequently, the parameter control unit 212 notifies the display device 210 of the changed parameter. Thus, a display of the user interface can be changed as illustrated in FIG. 5C. Accordingly, the digital zoom operation and the user interface are linked, so that the user can recognize that the parameter has been changed according to a change in the zoom magnification. However, in the digital zoom operation, there are cases where an image actually processed by the human body detection unit 204 is a captured image before being zoomed, instead of a digitally zoomed image. In such a case, the parameter should not be changed according to a change in the zoom magnification. That is, the parameter control unit 212 determines whether an image region serving as a target of video image recognition processing has been changed before and after a change in the zoom magnification. If the image region has not been changed, the parameter control unit 212 does not change the parameter of the recognition processing according to the change in the zoom magnification.

Hereinafter, a case is described in which an image to be processed by the human body detection unit 204 is an image which is clipped after being digitally zoomed. If a maximum size for human body detection exceeds the clipped-image range, the parameter control unit 212 may change a parameter such that the maximum size for human body detection is reduced to the clipped-image range. For example, in a case where the maximum size for human body detection before the digital zoom operation is (1000, 1000) and a size of the image to be clipped by the digital zoom operation is (800, 800), the parameter control unit 212 may change the maximum size to (800, 800). Alternatively, if the minimum size for human body detection exceeds the clipped-image range, the parameter control unit 212 may stop or cancel the human body detection processing.

Figure 7:
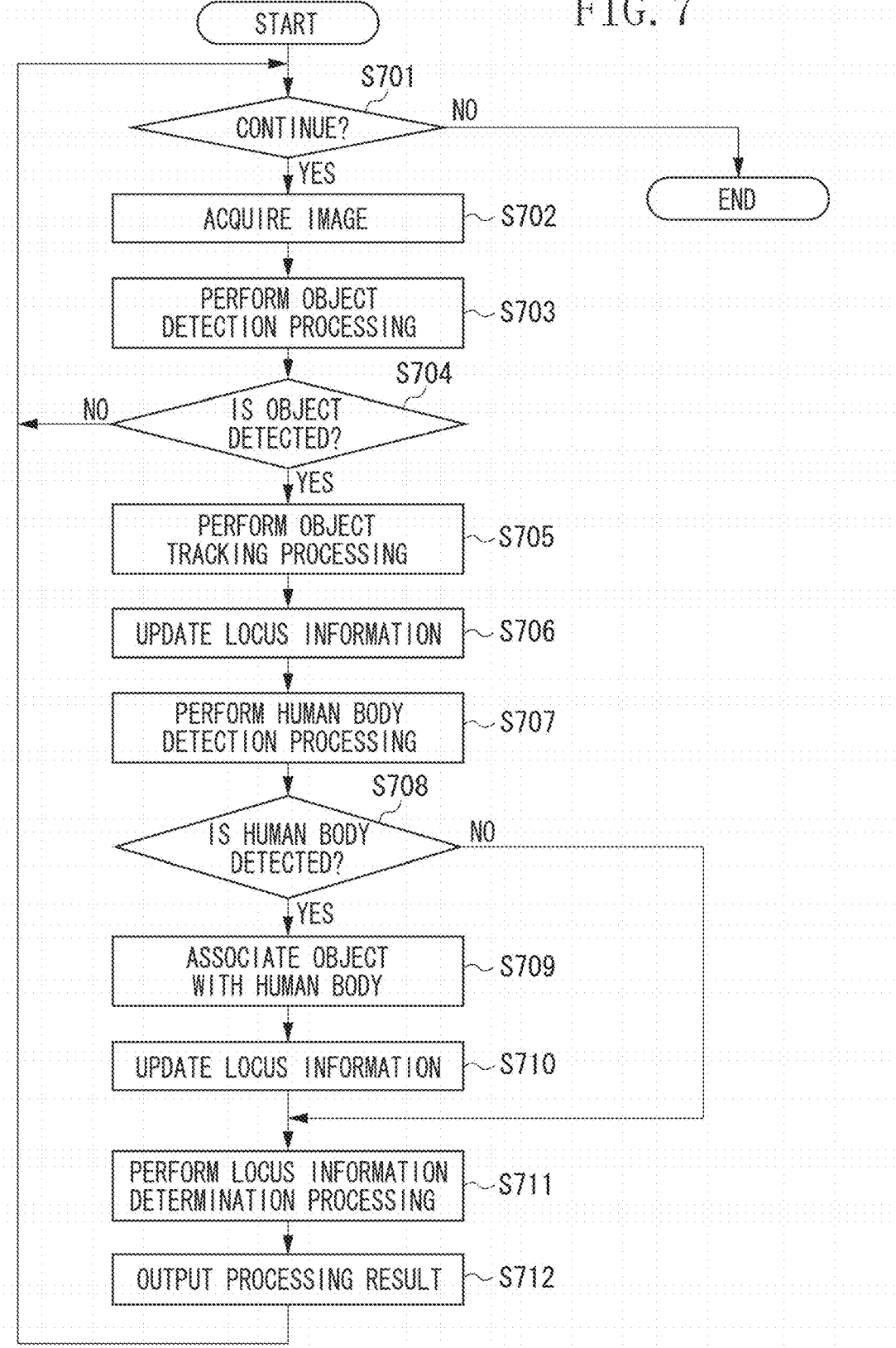
FIG. 7 is a flowchart illustrating processing performed by a control apparatus.

Next, operations of the control apparatus 200 according to the first exemplary embodiment are described with reference to a flowchart illustrated in FIG. 7. The control apparatus 200 of the present exemplary embodiment executes the processing illustrated in FIG. 7 by causing a central processing unit (CPU) serving as a control unit to read a control program for the processing illustrated in FIG. 7 from a memory and to execute the read program. Further, since the control apparatus 200 of the present exemplary embodiment is installed in the camera, the processing illustrated in FIG. 7 starts when the camera is activated. Alternatively, the control apparatus 200 may be another apparatus independent from the camera. The control apparatus 200 may be mounted on a device, such as a PC and a mobile terminal, which displays an image captured by the camera. In step S701, the control unit (not illustrated) of the control apparatus 200 determines whether the processing illustrated in FIG. 7 should be continued. For example, when a user gives an instruction that the processing illustrated in FIG. 7 should be finished, the control unit determines that the processing illustrated in FIG. 7 needs to be finished. When such an instruction is not provided from the user, the control unit determines that the processing illustrated in FIG. 7 should be continued. Accordingly, if the control unit determines that the processing should be continued (YES in step S701), the operation proceeds to step S702. On the other hand, if the control unit determines that the processing should not be continued (NO in step S701), the processing ends.

In step S702, the image acquisition unit 201 acquires image data input to the control apparatus 200. In step S703, the object detection unit 202 performs object detection processing with respect to the image acquired by the image acquisition unit 201. In step S704, the object detection unit 202 determines whether an object is detected in step S703. If the object detection unit 202 determines that the object is detected (YES in step S704), the operation proceeds to step S705. On the other hand, if the object detection unit 202 determines that the object is not detected (NO in step S704), the operation returns to step S701.

In step S705, the object tracking unit 203 performs object tracking processing. That is, the object tracking unit 203 associates the object detected from the frame with an object detected from another frame according to a predetermined condition. For example, if the same object is present in each of a plurality of frames, the object is associated according to the object tracking processing.

In step S706, the locus management unit 207 updates locus information according to a result of the tracking processing performed in step S705. The update of the locus information corresponds to addition of the information 303 illustrated in FIG. 3.

In step S707, the human body detection unit 204 uses the parameter set by the parameter setting unit 205 to perform human body detection processing with respect to the object detected by the object detection unit 202 and a region in the vicinity of such an object.

Herein, the human body detection processing performed by the control apparatus 200 of the present exemplary embodiment is described in detail with reference to a flowchart illustrated in FIG. 8.

In step S801, the parameter control unit 212 acquires a setting parameter (setting information such as a maximum size and a minimum size for human body detection) set by the parameter setting unit 205. The setting parameter is not limited to the information of the maximum size and the minimum size for human body detection. That is, in step S801, the parameter control unit 212 acquires a parameter for performing video image recognition processing. Moreover, the parameter control unit 212 acquires information about a current zoom magnification. The control apparatus 200 of the present exemplary embodiment is installed in the camera, and the parameter control unit 212 acquires the information about the zoom magnification from a storage unit inside the camera. However, the parameter control unit 212 may acquire the information about the zoom magnification from the PC 104 connected to the camera.

In step S802, the parameter control unit 212 determines whether the zoom magnification is changed by the zoom control unit 211. That is, the parameter control unit 212 determines whether the information about the zoom magnification acquired last time differs from the information about the zoom magnification acquired this time. If the parameter control unit 212 determines that a change in the zoom magnification is detected (YES in step S802), the operation proceeds to step S803. On the other hand, if the parameter control unit 212 determines that a change in the zoom magnification is not detected (NO in step S802), the operation proceeds to step S804.

In step S803, the parameter control unit 212 determines a parameter to be used in the human body detection processing in step S804 from the parameter acquired in step S801 and the zoom magnification acquired in step S801. For example, when the zoom magnification is changed from same size to 2 times, the parameter control unit 212 determines that the maximum size for human body detection is to be changed to 2 times. However, this is a mere example. That is, the parameter control unit 212 changes the parameter acquired in step S801 according to a change in the zoom magnification of the image capturing unit.

Further, the parameter control unit 212 of the present exemplary embodiment transmits a notification to the display device 210. The notification includes a message indicating that the parameter of the recognition processing has been changed according to a change in the zoom magnification, and notifying a changed parameter. Consequently, the display device 210 can display the message and the changed parameter (e.g., a rectangle corresponding to the maximum size or the minimum size for human body detection) on the parameter setting screen. Herein, the message indicating that the parameter of the video image recognition processing has been changed can be displayed.

In step S804, the human body detection unit 204 uses the parameter determined in step S803 (if the zoom magnification is not changed, a parameter according to the setting set by the user) to perform the human body detection processing. Upon completion of the human body detection processing in step S804, the operation proceeds to step S708 of the flowchart illustrated in FIG. 7.

In step S708, the human body detection unit 204 determines whether a human body is detected in step S707. If the human body detection unit 204 determines that the human body is detected (YES in step S708), the operation proceeds to step S709. On the other hand, if the human body detection unit 204 determines that the human body is not detected (NO in step S708), the operation proceeds to step S711.

In step S709, the object association unit 206 associates the object detected in step S703 with the human body detected in step S707. Accordingly, the object association unit 206 associates the object with the human body according to an overlap region between the circumscribed rectangle of the object and the circumscribed rectangle of the human body as described above.

In step S710, the locus management unit 207 updates locus information based on a result of the association processing performed in the step S709. The update of the locus information corresponds to addition of the information 303 illustrated in FIG. 3. In step S711, the locus information determination unit 208 performs locus information determination processing to determine whether the object has passed a detection line. The locus information determination unit 208 determines whether the object has passed through the detection line. The locus information determination unit 208 determines the passage of the object based on whether a movement vector has intersected a line segment for the passage detection. The movement vector indicates a movement from a human body attribute object in the immediate preceding frame of a target frame to a human body attribute object in the target frame. The human body attribute object represents an object that is determined as an associated object and provided with the same object ID by the object tracking unit 203.

In step S712, the external output unit 209 outputs a processing result regarding the video image recognition processing to an external unit. Then, the operation returns to step S712. For example, the external output unit 209 outputs position information of the circumscribed rectangle to the display device 210 such that circumscribed rectangles of a detected object and a detected human body are displayed on a screen displaying a captured image. Further, for example, if passage of a human through a detection line or intrusion into a detection region is detected, the external output unit 209 outputs a detection result to the display device 210 such that a message corresponding to the detection result is displayed on a display screen of the display device 210.

According to the present exemplary embodiment, therefore, a parameter of video image recognition processing is changed according to a change in the zoom magnification. Thus, the recognition processing can be more suitably performed with respect to an image captured by an image capturing unit having a function of changing a zoom magnification. The above exemplary embodiment has been mainly described using the example in which a maximum size and a minimum size for human body detection serve as parameters. However, a detection target may be a predetermined object other than a human body, for example, a bicycle, a face of a person, and an animal. If a bicycle is used as a detection target, a maximum size and a minimum size for bicycle detection are set as parameters for recognition processing. Such parameters can be changed according to a change in zoom magnification.

According to the above-described exemplary embodiment(s), the recognition processing is more suitably performed with respect to the video image captured by the image capturing unit having a function of changing the zoom magnification.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-012800 filed Jan. 27, 2014, which is hereby incorporated by reference herein in its entirety.

What is claimed is:

1. An information processing apparatus comprising:
a hardware processor; and
a memory for storing instructions to be executed by the hardware processor,
wherein, when the instructions stored in the memory are executed by the hardware processor, the information processing apparatus functions as:
a display controlling unit configured to cause a display unit to display, overlaid on a first image captured by a camera, a first guide representing a maximum size and a second guide representing a minimum size,
wherein each of the maximum size and minimum size is changeable based on a user operation performed while the first guide and second guide are displayed overlaid on the first image; and
a setting unit configured to set the maximum size and minimum size that have been changed,
wherein the set maximum size and minimum size are to be used for detecting an object whose size is between the set maximum size and minimum size from a second image captured by the camera at a time different from the first image.

2. The information processing apparatus according to claim 1, wherein the apparatus further functions as:
a tracking unit configured to associate, in a case where a distance between a first object detected from the first image and a second object detected from the second image is shorter than a threshold, the first object in the first image and the second object in the second image.

3. The information processing apparatus according to claim 1, wherein the display controlling unit causes the display unit to display a user interface, wherein each of the size of the first guide and the size of the second guide is changeable by dragging a border or a node thereof by using the user interface.

4. The information processing apparatus according to claim 1, wherein the object to be detected from the second image captured by the camera is an image of a human.

5. The information processing apparatus according to claim 1, wherein, when the instructions stored in the memory are executed by the hardware processor, the information processing apparatus functions as a receiving unit configure to receive operation information for setting a detection area of an object.

6. The information processing apparatus according to claim 1, wherein the first guide and the second guide are rectangular.

7. The information processing apparatus according to claim 1, wherein each of the first image and second image are image frames forming a moving image.

8. The information processing apparatus according to claim 1,
wherein the information processing apparatus functions as a control apparatus external to the camera, and
wherein the setting unit sets the maximum size and minimum size to the camera, in response to the user operation.

9. The information processing apparatus according to claim 1, wherein each of the maximum size and minimum size is changeable by dragging a border or a node of the respective guide by the user operation.

10. A computer-implemented information processing method comprising:

reading out from a memory instructions stored therein to be executed by a hardware processor, wherein, when the instructions stored in the memory are executed by the hardware processor, the hardware processor performs functions comprising:

displaying, overlaid on a first image captured by a camera, a first guide representing a maximum size and a second guide representing a minimum size, wherein each of the maximum size and minimum size is changeable based on a user operation performed while the first guide and second guide are displayed overlaid on the first image; and setting the maximum size and minimum size that have been changed, wherein the set maximum size and minimum size are to be used for detecting an object whose size is between the set maximum size and minimum size from a second image captured by the camera at a time different from the first image.

11. The computer-implemented information processing method according to claim 10, further comprising:

tracking a first object detected from the first image and a second object detected from the second image, and associating, in a case where a distance between the first object detected from the first image and the second object detected from the second image is shorter than a threshold, the first object in the first image and the second object in the second image.

12. The computer-implemented information processing method according to claim 10, further comprising:

displaying a user interface, wherein each of the size of the first guide and the size of the second guide is changeable by dragging a border or a node thereof by using the user interface.

13. The computer-implemented information processing method according to claim 10, wherein the object to be detected from the second image captured by the camera is an image of a human.

14. The computer-implemented information processing method according to claim 10, further comprising:

receiving operation information for setting a detection area of an object.

15. The computer-implemented information processing method according to claim 10, wherein the first guide and the second guide are rectangular.

16. A non-transitory computer-readable medium storing computer executable instructions for causing a computer to execute an information processing method comprising:

displaying, overlaid on a first image captured by a camera, a first guide representing a maximum size and a second guide representing a minimum size, wherein each of the maximum size and minimum size is changeable based on a user operation performed while the first guide and second guide are displayed overlaid on the first image; and setting the maximum size and the minimum size that have been changed, wherein the set maximum size and minimum size are to be used for detecting an object whose size is between the set maximum size and minimum size from a second image captured by the camera at a time different from the first image.

17. The non-transitory computer-readable medium according to claim 16, wherein the method further comprises:

tracking a first object detected from the first image and a second object detected from the second image, and associating, in a case where a distance between the first object detected from the first image and the second object detected from the second image is shorter than a threshold, the first object in the first image and the second object in the second image.

18. The non-transitory computer-readable medium according to claim 16, wherein the method further comprises:

displaying a user interface, wherein each of the size of the first guide and the size of the second guide is changeable by dragging a border or a node thereof by using the user interface.

19. The non-transitory computer-readable medium according to claim 16, wherein the object to be detected from the second image captured by the camera is an image of a human.

20. The non-transitory computer-readable medium according to claim 16, wherein the method further comprises receiving operation information for setting a detection area of an object.

21. The non-transitory computer-readable medium according to claim 16, wherein the first guide and the second guide are rectangular.

22. An image processing apparatus connected to a camera, the image processing apparatus comprising:

a hardware processor; and a memory for storing instructions to be executed by the hardware processor, wherein, when the instructions stored in the memory are executed by the hardware processor, the image processing apparatus functions as:

a receiving unit configured to receive a plurality of images captured by the camera, a display controlling unit configured to cause a display screen to display, overlaid on a first image captured by the camera, a first guide representing a maximum size and second guide representing a minimum size which are used for detecting an object, wherein each of the maximum size and minimum size is changeable based on a user operation performed while the first guide and second guide are displayed overlaid on the first image; and a detection unit configured to detect from a second image captured by the camera an object whose size is between the maximum size and the minimum size set by the user operation upon changing to the size of the first guide and the size of the second guide.

23. The image processing apparatus according to claim 22, wherein each of the size of the first guide and the size of the second guide is changeable by dragging a border or a node thereof by the user operation.

24. The image processing apparatus according to claim 22, wherein the object to be detected from the second image is an image of a human.

25. The image processing apparatus according to claim 22, wherein, when the instructions stored in the memory are executed by the hardware processor, the information processing apparatus functions as a receiving unit configure to receive operation information for setting a detection area of an object.

26. The image processing apparatus according to claim 22, wherein each of the first guide and the second guide is one of a rectangle, polygon or circle.

27. The image processing apparatus according to claim 22, wherein, when the instructions stored in the memory are executed by the hardware processor, the information processing apparatus functions as an outputting unit configured to output a result of detection by the detection unit.

\* \* \* \* \*